US012632425B2

(12) United States Patent
Kanchana Sivakumar et al.

(10) Patent No.: US 12,632,425 B2
(45) Date of Patent: May 19, 2026

(54) HYBRID APPROACH FOR MEASURING STATISTICAL DRIFT AND DATA QUALITY ON LARGE DATASETS

(71) Applicant: Oracle International Corporation, Redwood Shores, CA (US)

(72) Inventors: Kripa Kanchana Sivakumar, Seattle, WA (US); Mayoor Rao, San Jose, CA (US); John Backof, Tiburon, CA (US); Andrew Ioannou, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 18/104,586

(22) Filed: Feb. 1, 2023

(65) Prior Publication Data

US 2024/0256503 A1 Aug. 1, 2024

(51) Int. Cl.
*G06F 16/215* (2019.01)
*G06F 16/25* (2019.01)

(52) U.S. Cl.
CPC .......... *G06F 16/215* (2019.01); *G06F 16/258* (2019.01)

(58) Field of Classification Search
None
See application file for complete search history.

(56) References Cited

U.S. PATENT DOCUMENTS

| | | | | | |
|---|---|---|---|---|---|
| 10,067,955 | B1 * | 9/2018 | Wu | .......................... | G06F 16/285 |
| 10,951,484 | B1 * | 3/2021 | Liu | .......................... | H04L 41/14 |
| 11,200,515 | B1 * | 12/2021 | Hopkins | ............ | G06Q 30/0201 |
| 2011/0055250 | A1 * | 3/2011 | Nandy | .................. | G06F 16/248 |
| | | | | | 715/810 |
| 2017/0180909 | A1 * | 6/2017 | Gardner | ................ | G06F 3/0488 |
| 2017/0235848 | A1 * | 8/2017 | Van Dusen | .......... | G06Q 10/101 |
| | | | | | 705/12 |
| 2018/0181632 | A1 * | 6/2018 | Zarum | .................. | G06F 16/254 |
| 2019/0019095 | A1 * | 1/2019 | Mietke | ................ | G06F 16/2358 |
| 2020/0286025 | A1 * | 9/2020 | Ramchandran | ........ | G06N 5/046 |
| 2020/0380303 | A1 * | 12/2020 | Briancon | ................ | G06Q 40/08 |
| 2020/0380417 | A1 * | 12/2020 | Briancon | ......... | G06Q 10/06393 |
| 2021/0112101 | A1 * | 4/2021 | Crabtree | ............ | G06F 16/2477 |
| 2021/0158106 | A1 * | 5/2021 | Vasseur | .................. | H04L 41/147 |
| 2021/0271986 | A1 * | 9/2021 | Hu | ............................ | G06F 9/54 |
| 2021/0334274 | A1 * | 10/2021 | Teo | ..................... | G06F 16/2477 |

* cited by examiner

*Primary Examiner* — Aleksandr Kerzhner
*Assistant Examiner* — Loan T Nguyen
(74) *Attorney, Agent, or Firm* — Hickman Becker Bingham Ledesma LLP

(57) ABSTRACT

Techniques related to a hybrid approach for measuring statistical drift and data quality on large datasets are provided. In one technique, a data monitoring definition is accessed that includes predefined configuration data and a custom configuration data that is specified by a user, wherein the custom configuration data includes custom instructions pertaining to one or more of data reading, metrics generation, or data writing. Based on the data monitoring definition, executable code is generated that comprises a data reading portion, a metrics generation portion, and a data writing portion. Executing the executable code comprises: based on the data reading portion, reading a dataset based on location data specified in the monitoring definition; based on the metrics generation portion, generating a set of metrics based on the dataset; and based on the data writing portion, writing a result that is based on the set of metrics.

20 Claims, 16 Drawing Sheets

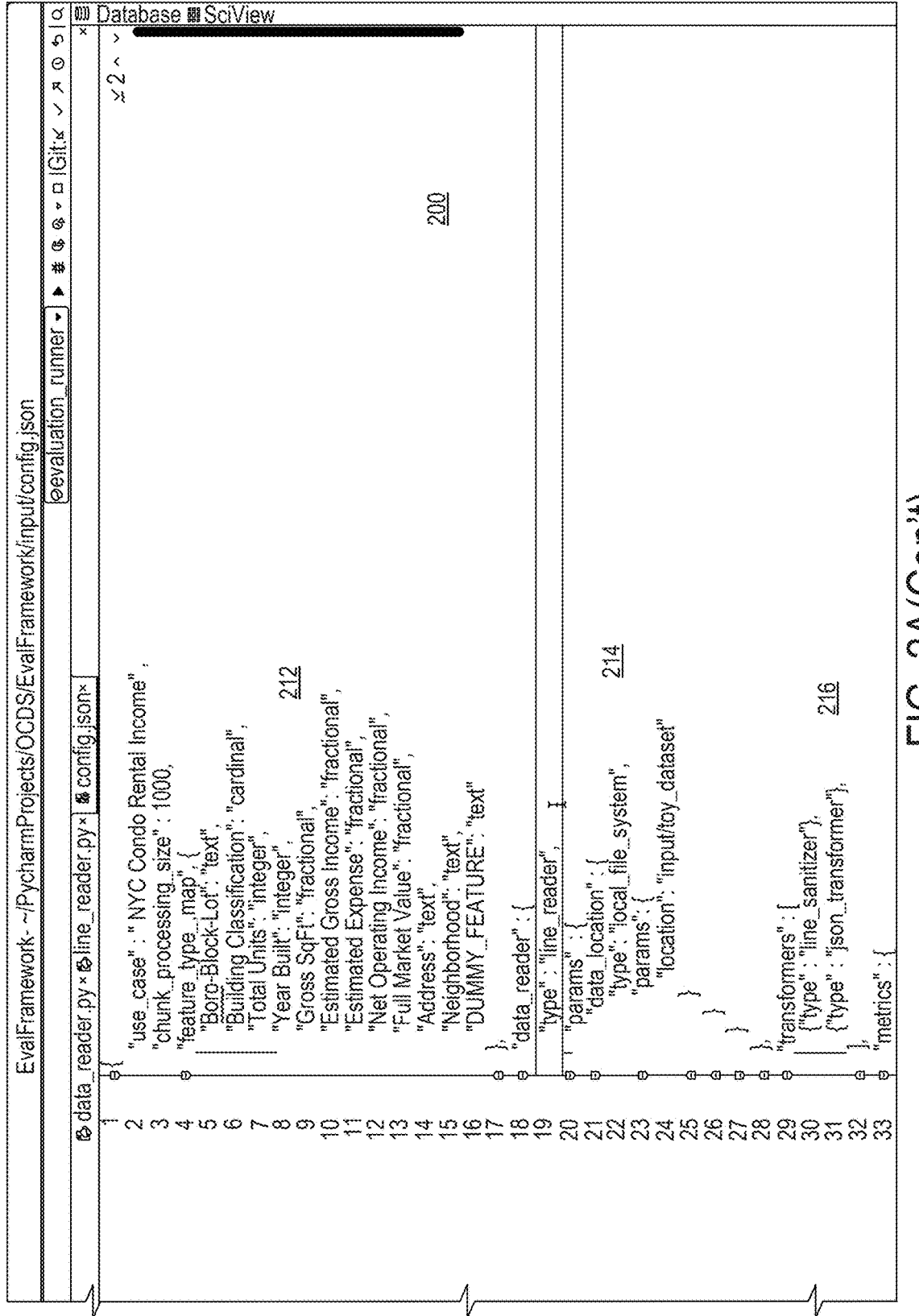

```
EvalFramework- ~/PycharmProjects/OCDS/EvalFramework/input/config.json
                                    evaluation_runner ▼  ▲ # ⑥ ⑥ ▼ □ IGit:∠ ∕ ⊼ ⊘ ↰ ⊡
                                                                                          ×
                                                                                      ⤮ 2 ∧ ∨
⑥ data_reader.py×  ⑥ line_reader.py×  ⑯ config.json×
  1  {
  2     "use_case": " NYC Condo Rental Income",
  3     "chunk_processing_size": 1000,
  4     "feature_type_map": {
  5         "Boro-Block-Lot": "text",
  6         "Building Classification": "cardinal",
  7         "Total Units": "integer",
  8         "Year Built": "integer",                           212
  9         "Gross SqFt": "fractional",
 10         "Estimated Gross Income": "fractional",
 11         "Estimated Expense": "fractional",
 12         "Net Operating Income": "fractional",
 13         "Full Market Value": "fractional",
 14         "Address": "text",
 15         "Neighborhood": "text",
 16         "DUMMY_FEATURE": "text"
 17     },
 18     "data_reader": {
 19         "type": "line_reader",                                    214
 20         "params": {                                 ]
 21             "data_location": {
 22                 "type": "local_file_system",
 23                 "params": {
 24                     "location": "input/toy_dataset"
 25                 }
 26             }
 27         }
 28     },
 29     "transformers": [                                         216
 30         {"type": "line_sanitizer"},
 31         {"type": "json_transformer"},
 32     ],
 33     "metrics": {
```

200

FIG. 2A(Con't)

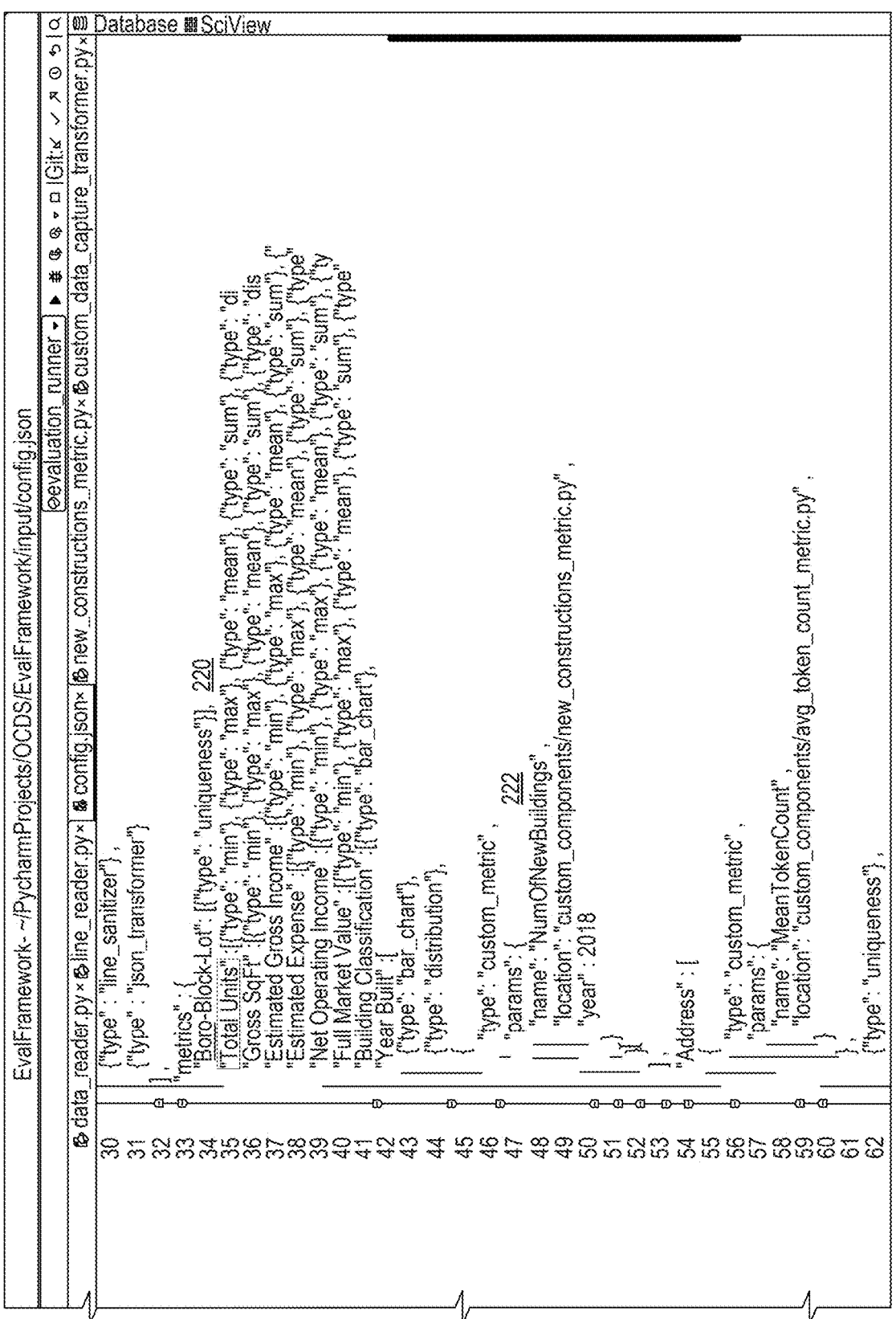
FIG. 2B(Con't)

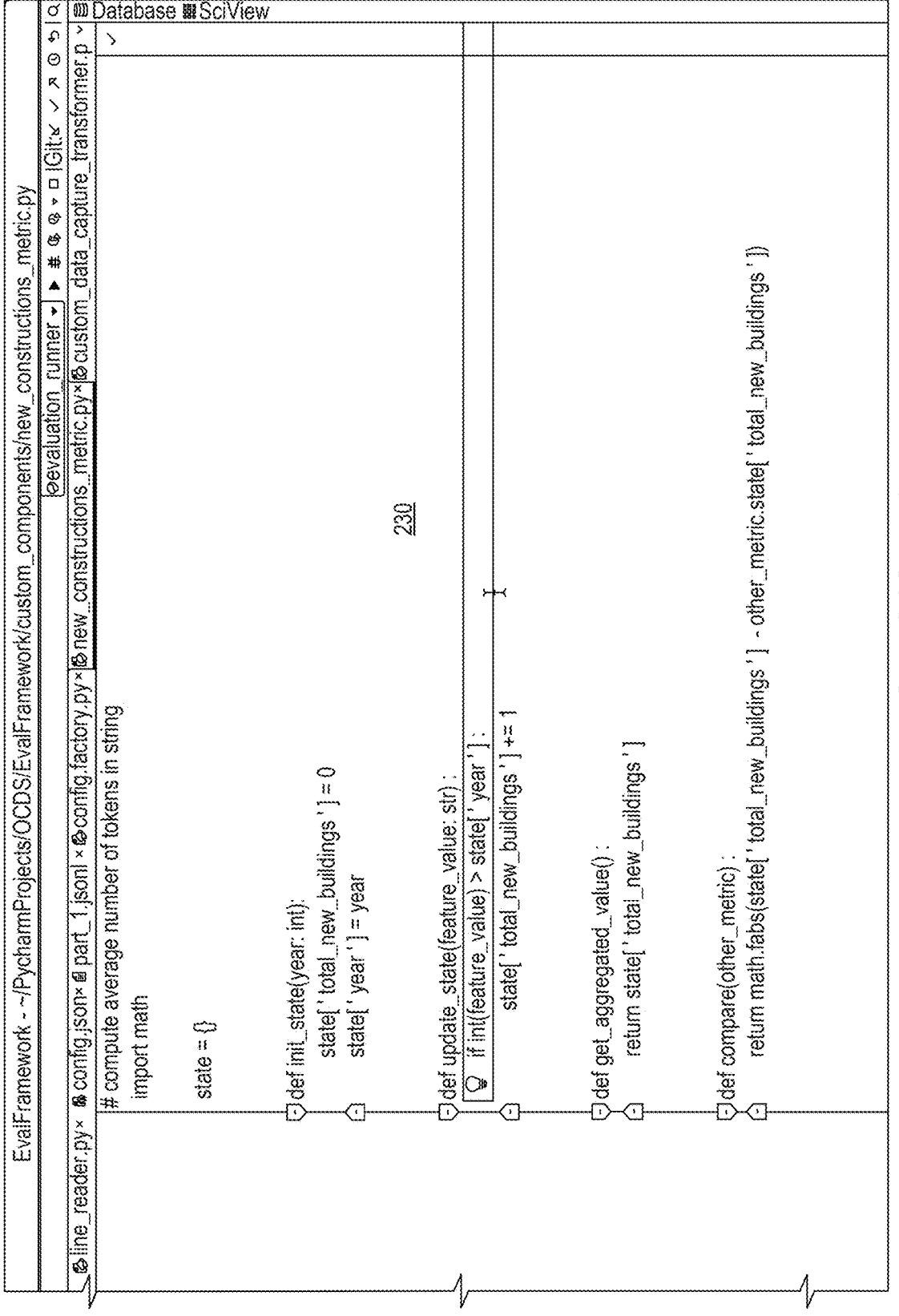
FIG. 2C(Con't)

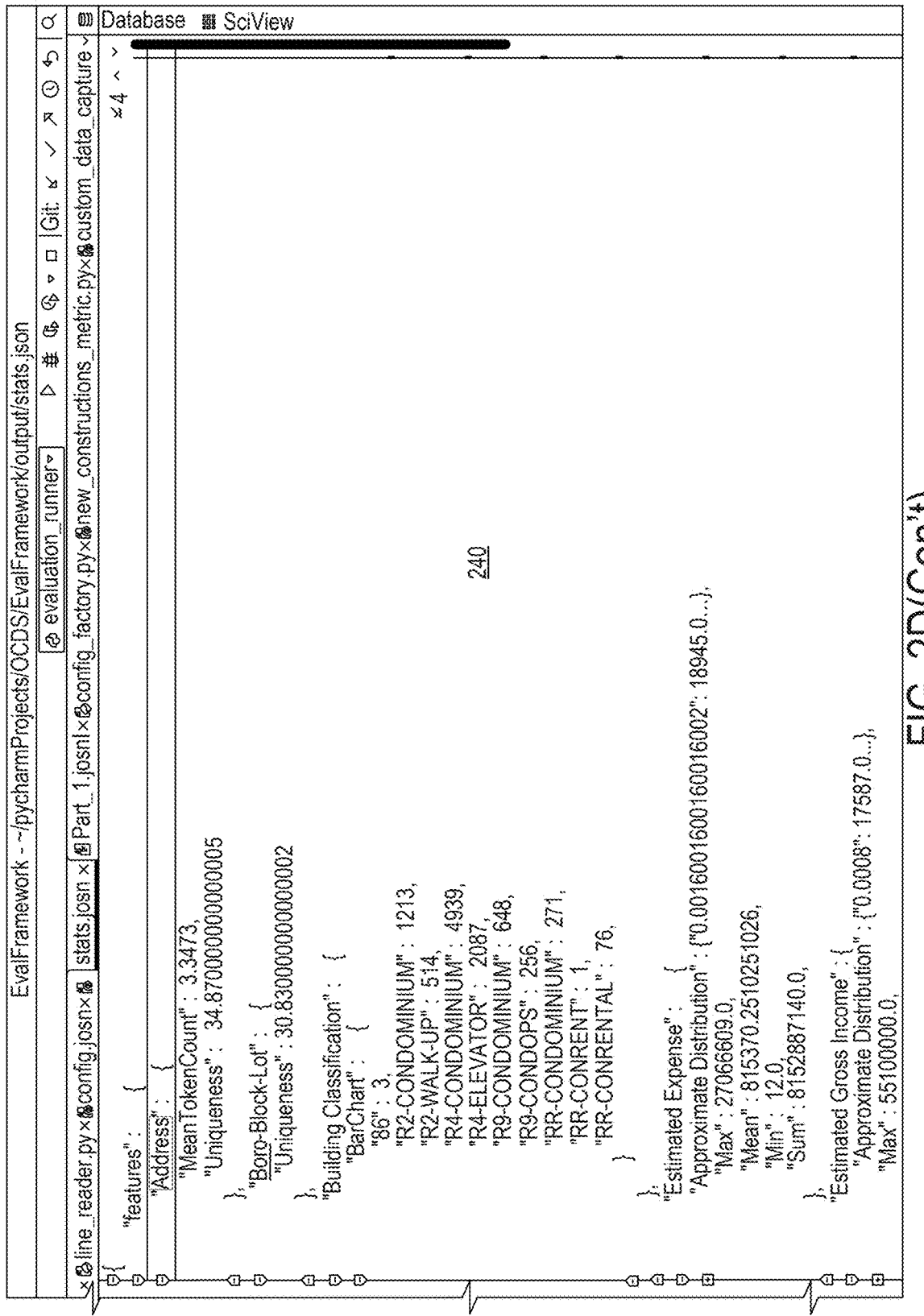

```
EvalFramework - ~/pycharmProjects/OCDS/EvalFramework/output/stats.json

× @ line_reader.py × @ config.json × @ stats.josn × @ Part_1.josnl × @ config_factory.py × @ new_constructions_metric.py × @ custom_data_capture ∨

@ evaluation_runner ∨    △ ⅲ & & ▷ ▽ □ | Git: ⸜ ✓ ⊘ ⊼ ∨

{
    "features": {
        "Address": {
            "MeanTokenCount": 3.3473,
            "Uniqueness": 34.87000000000005
        },
        "Boro-Block-Lot": {
            "Uniqueness": 30.83000000000002
        },
        "Building Classification": {
            "BarChart": {
                "86": 3,
                "R2-CONDOMINIUM": 1213,
                "R2-WALK-UP": 514,
                "R4-CONDOMINIUM": 4939,
                "R4-ELEVATOR": 2087,
                "R9-CONDOMINIUM": 648,
                "R9-CONDOPS": 256,
                "RR-CONDOMINIUM": 271,
                "RR-CONRENT": 1,
                "RR-CONRENTAL": 76,
            }
        },
        "Estimated Expense": {
            "Approximate Distribution": {"0.0016001600160016002": 18945.0...},
            "Max": 27066609.0,
            "Mean": 815370.2510251026,
            "Min": 12.0,
            "Sum": 8152887140.0,
        },
        "Estimated Gross Income": {
            "Approximate Distribution": {"0.0008": 17587.0...},
            "Max": 55100000.0,
```

240

■) Database    ▦ SciView

FIG. 2D(Con't)
```

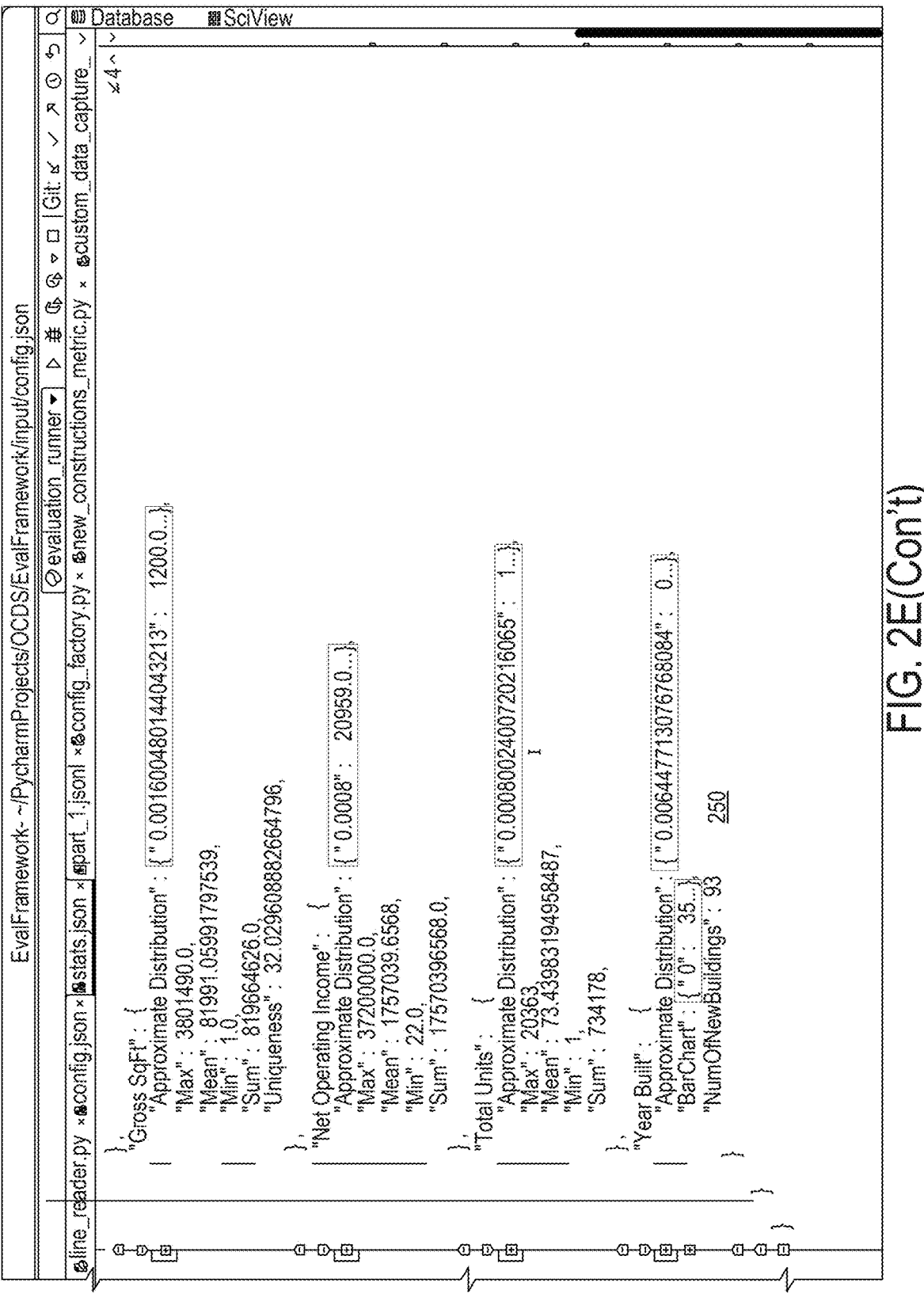
FIG. 2E(Con't)

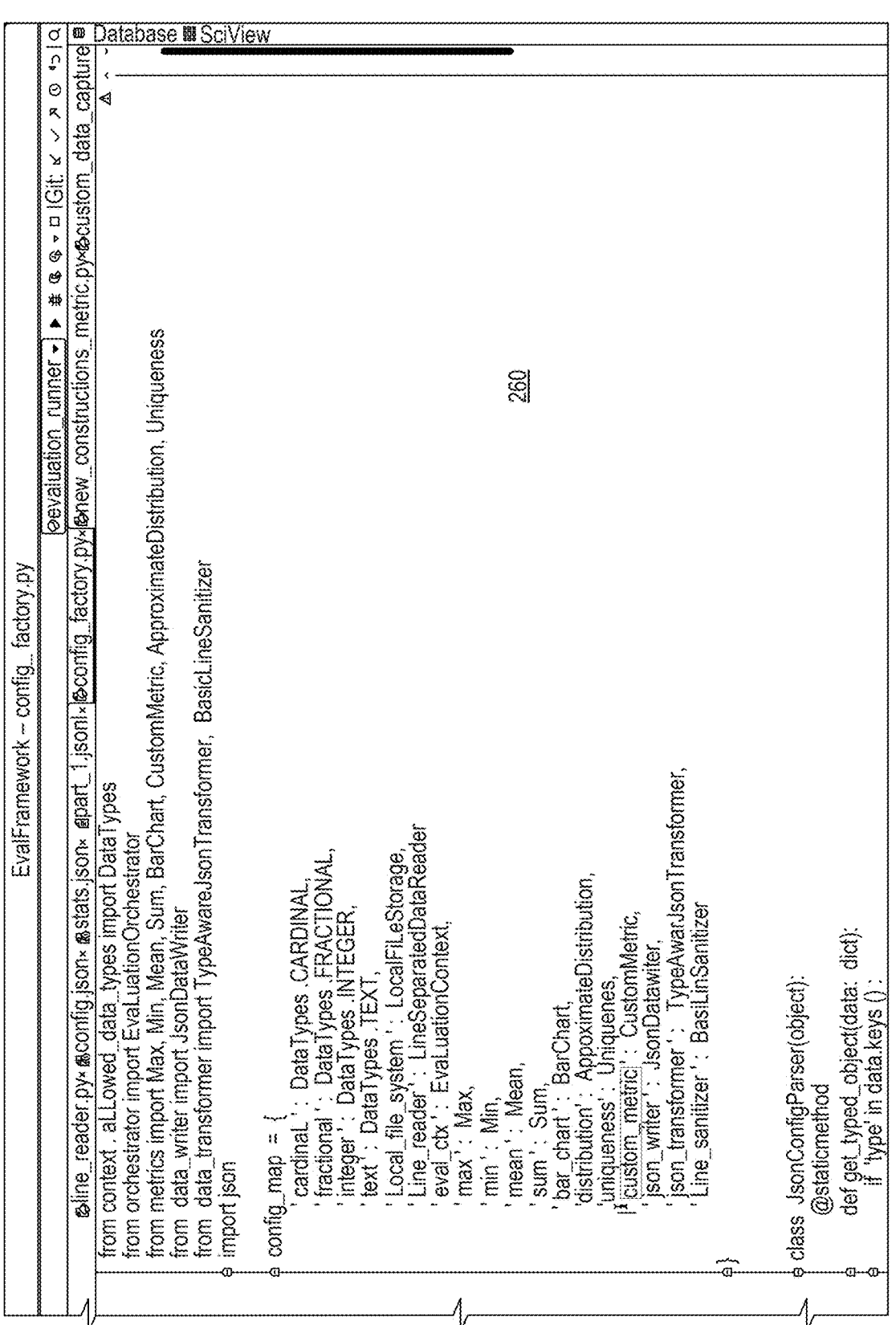

```
EvalFramework ~ config_factory.py

⊚line_reader.py×  ⊚config.json×  ⊚stats.json×  ⊚part_1.json×  ⊚config_factory.py×  ⊚evaluation_runner▾  ▲ # ⊕ ⊘ ▾ ▢ IGit ⌐ ⟋ ⊙ ↄ ⎸ ⌐
                                                                  ⊚new_constructions_metric.py×⊚custom_data_capture from context . aLLowed_data_types import DataTypes
from orchestrator import EvaLuationOrchestrator
from metrics import Max, Min, Mean, Sum, BarChart, CustomMetric, ApproximateDistribution, Uniqueness
from data_writer import JsonDataWriter
from data_transformer import TypeAwareJsonTransformer, BasicLineSanitizer
import json config_map = {
    'cardinaL': DataTypes .CARDINAL,
    'fractional' : DataTypes .FRACTIONAL,
    'integer': DataTypes .INTEGER,
    'text' : DataTypes .TEXT,
    'Local_file_system' : LocalFiLeStorage,
    'Line_reader' : LineSeparatedDataReader
    'eval_ctx' : EvaLuationContext,
    'max' : Max,
    'min' : Min,
    'mean' : Mean,
    'sum' : Sum,
    'bar_chart' : BarChart,
    'distribution' : AppoximateDistribution,
    'uniqueness' : Uniquenes,
    'custom_metric' : CustomMetric,
    'json_writer' : JsonDatawriter,
    'json_transformer' : TypeAwareJsonTransformer,
    'Line_sanitizer' : BasiLinSanitizer class JsonConfigParser(object):
    @staticmethod
    def get_typed_object(data: dict):
        if 'type' in data.keys () :
```

260

FIG. 2F(Con't)

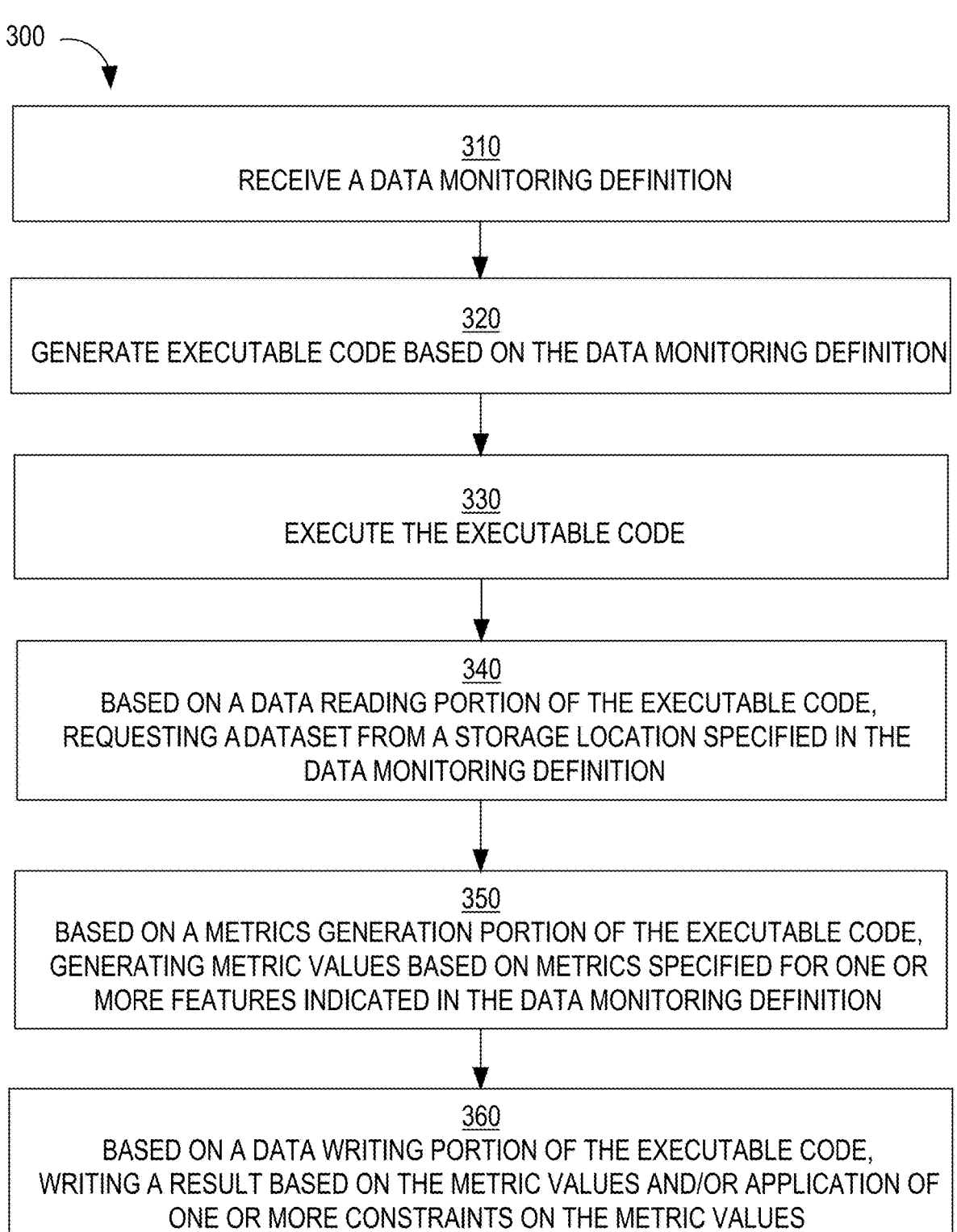

300

310
RECEIVE A DATA MONITORING DEFINITION

320
GENERATE EXECUTABLE CODE BASED ON THE DATA MONITORING DEFINITION

330
EXECUTE THE EXECUTABLE CODE

340
BASED ON A DATA READING PORTION OF THE EXECUTABLE CODE, REQUESTING A DATASET FROM A STORAGE LOCATION SPECIFIED IN THE DATA MONITORING DEFINITION

350
BASED ON A METRICS GENERATION PORTION OF THE EXECUTABLE CODE, GENERATING METRIC VALUES BASED ON METRICS SPECIFIED FOR ONE OR MORE FEATURES INDICATED IN THE DATA MONITORING DEFINITION

360
BASED ON A DATA WRITING PORTION OF THE EXECUTABLE CODE, WRITING A RESULT BASED ON THE METRIC VALUES AND/OR APPLICATION OF ONE OR MORE CONSTRAINTS ON THE METRIC VALUES

502 {
- 502A — APPLICATION PROGRAM 1
- 502B — APPLICATION PROGRAM 2
- 502C — APPLICATION PROGRAM 3
- [...]
- 502N — APPLICATION PROGRAM N
}

OPERATING SYSTEM
(e.g., WINDOWS, UNIX, LINUX, MAC OS, IOS, ANDROID, OR LIKE)

516 — GRAPHICAL USER INTERFACE (GUI)

510

530 — VIRTUAL MACHINE MONITOR (VMM)

520 — BARE HARDWARE (e.g., COMPUTING DEVICE 400)

HYBRID APPROACH FOR MEASURING STATISTICAL DRIFT AND DATA QUALITY ON LARGE DATASETS

TECHNICAL FIELD

The present disclosure relates to measuring statistical drift and data quality of machine learning datasets and, more particularly, to providing a hybrid approach to users of dataset analysis systems.

BACKGROUND

Machine learning systems are sensitive to variations in data which can stem from incorrect transformation logic or malformed data at the data source. Such discrepancies in data can have a large impact on a model's performance and may even adversely affect the enterprise outcome. One class of data quality issues is when non-null values are expected by a production system and an exception or error is triggered by missing values, which leads to failures in the production system. When data is at scale, these failures are expensive to fix, resulting in re-runs costing valuable instance hours for an enterprise customer. These types of issues are clear and obvious.

Another class of data quality issues are not so obvious; rather, these types of data quality issues are silent failures that happen over a period of time. One subclass is different data sources may produce data with a differing cadence, resulting in unintended outputs from models. One subclass is the gradual shift in the distribution of data, which can lead to unexpected outputs from machine learning (ML) models. ML models can be "silently" impacted by data-drift. There are no explicit errors in how the data is formulated. However, the semantics of the data itself may have changed over time. Detecting such drift is important so that ML model inferences can be corrected by other reactionary mechanisms, such as retraining the ML model. Some systems anticipate such drift and over-compensate for that drift by retraining on a daily basis, which ends up being a costly operation. A ML data monitoring system tries to balance the risk and cost by providing crucial insights to when it may be conducive to retrain.

A system that performs ML monitoring tends to catch deviations in data quality before the deviations create a catastrophic impact on an enterprise. ML monitoring also acts as a guardrail by capturing in-flight data periodically and measuring the data's quality against a previously established baseline. Ideally, a system that performs ML monitoring should enable an enterprise to calculate data quality metrics on their respective datasets and define and validate data quality constraints so that the enterprise can be informed about changes in their data distribution over time.

From the perspective of a general purpose data science platform, this ideal represents an ambiguous and an open-ended problem. The following factors can vary from use-case to use-case: (1) customers can store data in different formats; (2) data can exist in different storage locations and the choice of storage technology could be different; (3) owing to the domain that generated the data, the specific drift metric that needs to be computed can differ; and (4) customers may have different mechanisms to deal with their ML systems once drift has been detected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a flow diagram that depicts an example process for data monitoring, in an embodiment;

FIG. 5 is a block diagram of a basic software system that may be employed for controlling the operation of the example computer system.

DETAILED DESCRIPTION

Figure 1:
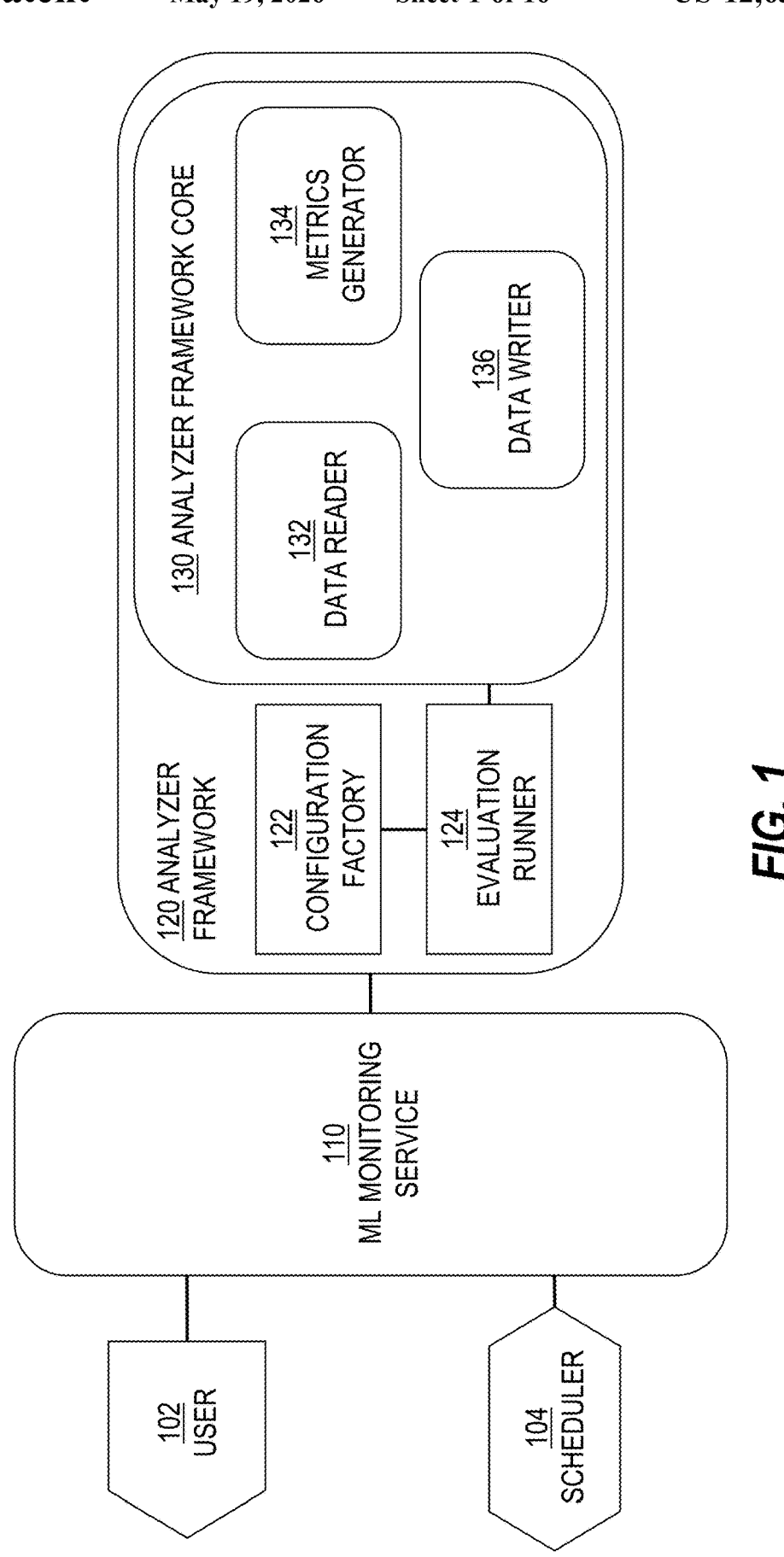
FIG. 1 is a block diagram that depicts an example data monitoring system that comprises multiple components, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Fixed, out-of-the-box solutions to data monitoring require users to conform their data and expectations to what those solutions provide. However, it is not possible to capture all types of data quality issues or to anticipate all data formats that users might have. Techniques are provided for an extensible framework for monitoring data quality and performing drift detection. The extensible monitoring framework makes it possible for users to write their own custom modules to plug into the framework and still obtain the benefits of monitoring, reporting, metrics generation, etc., provided by the framework.

Thus, the extensible monitoring framework includes a standard set of interfaces and components for common operations on data, such as data reading, transformation and normalization, computing statistical representations on the normalized data, drift metric generation, and alerting. In addition to providing general purpose implementations for each of the above components, the extensible monitoring framework includes custom components: one to which customers can submit code snippets (instead of having to obtain a copy of the entire monitoring framework and re-build the framework from scratch). This paves way for a hybrid approach that includes accepting well-formed and easy-to-author code snippets, i.e., user-defined routines from customers. The code snippets are "stitched" with the framework code at execution time of the monitoring framework. This creates a channel through which users can inject their logic and not be limited by the default offering of the monitoring framework. This makes the monitoring framework robust with a minimal number of parameters and encourages adoption across various domains and use-cases.

Embodiments include a fully service-managed solution for a (e.g., enterprise) user to perform data monitoring (e.g., validations on their datasets) while not making any assumptions about the data source, data type, size of data, or the metrics. In addition, the user is not expected to extend an entire framework in order for the monitoring framework to work for the user's own use-cases. Thus, embodiments do not have a steep learning curve. With embodiments, users are able to author simple routines and inject those routines directly into the monitoring framework via APIs. The monitoring framework can process arbitrary amounts of data and can be executed on low-cost instances, the management of which is hidden from the user. The foregoing are at least some of the improvements to computer-related technology.

System Overview

FIG. 1 is a block diagram that depicts an example ML monitoring system 100 that comprises multiple components, in an embodiment. Each component of ML monitoring system 100 takes some form of data as input and produces some transformation of that data as an output.

ML monitoring system 100 comprises a ML monitoring service 110, and an analyzer framework 120. Analyzer framework 120 comprises a configuration factory 122, an evaluation runner 124, and an analyzer framework core 130, which comprises a data reader 132, a metrics generator 134, and a data writer 136. Each of these components may be implemented in software or any combination of software and hardware.

A user 102, operating a computing device, causes an input to be transmitted to ML monitoring service 110. The input comprises configuration data indicating a monitoring definition, which may be stored in a file or other document. User 102 may select a monitoring definition template from among multiple monitoring definition templates (described in more detail herein) and modify the selected monitoring definition template based on the user's requirements, resulting in a personalized or customized monitoring definition that caters to a specific monitoring use case.

Examples of the computing device that user 102 operates include a desktop computer, a laptop computer, a tablet computer, a smartphone, and a wearable device. The computing device is communicatively coupled to ML monitoring service 110 over a computer network, such as a LAN, WAN, or the Internet.

ML monitoring service 110 may return a definition identifier that uniquely identifies the monitoring definition that user 102 submitted. This definition identifier may be used later to schedule subsequent runs of the monitoring definition.

ML monitoring service 110 also creates a compute job based on the monitoring definition and submits the computing job to analyzer framework 120. ML monitoring service 110 also parses the outcome generated by the compute job and creates one or more of the following: alerts, tickets, and visualizations, which help an engineer to take corrective actions on their data pipelines.

Analyzer Framework

Analyzer framework 120 may be packaged in one of multiple ways. For example, analyzer framework 120 may be packaged as a Docker container, which is an environment that allows users to include all dependencies into the framework and convert the framework into a binary. The artifact containing analyzer framework 120 may be deployed to any managed compute instance, such as a virtual machine or a Kubernetes spark.

Configuration factory 122 parses a monitoring definition provided by user 102 and converts the configuration data in the monitoring definition into code objects (or executable code artifacts), such as in Python, which is an interpreted language and, therefore, does not require an explicit compilation step. Code objects are converted to executables directly and injected into the memory of the host machine. These code objects become data reader 132, metrics generator 134, and data writer 136. Thus, configuration factory 122 acts as a serialization mechanism. For example, configuration factory 122 maps values (of predefined types and of custom types) to functions that will be invoked.

Configuration factory 122 may also identify errors and throw exceptions if a portion of the configuration data is malformed. Examples of errors in configuration include a malformed configuration file, a misconfiguration, and incorrect configuration logic. An example of a malformed configuration file is a JSON configuration file that does not compile, which could be due to missing parentheses or malformed JSON structures. An example of a misconfiguration is an incorrect name (of a feature or column) in the configuration file. Thus, configuration factory 122 may be both a validator and a translator.

In another embodiment, configuration factory 122 is split into at least two parts, one for validating (i.e., ensuring that the configuration data is not malformed) and one for translating (i.e., converting the configuration data into code objects).

Evaluation runner 124 is the routine that accepts code objects (generated by configuration factory 122) and triggers the components in analyzer framework core 130 in order: first data reader 132, then metrics generator 134, and then data writer 136. Thus, evaluation runner 124 acts as an orchestrator; invoking different components in a particular order. Data reader 132 may include (or invoke) one or more data transformers that transform the read data into a format that is different than the original (raw) format of the read data.

Evaluation runner 124 detects when data reader 132 completes its tasks of reading and, optionally, one or more data transformations. In response to that detection, evaluation runner 124 causes metrics generator 134 to execute. Evaluation runner 124 may specify location data that informs metrics generator 134 where output of data reader 132 is stored. This output becomes input to metrics generator 134, which generates one or more metrics, whether predefined metrics, custom metrics, or both. Metrics generator 134 includes or invokes a process for applying constraints on the generated metrics.

Again, evaluation runner 124 detects when metrics generator 134 completes its tasks of generating metrics and, optionally, applying one or more constraints. In response to that detection, evaluation runner 124 causes data writer 136 to execute. Evaluation runner 124 may specify location data that informs data writer 136 where output of metrics generator 134 is stored. This output becomes input to data writer 136, which writes, to (e.g., persistent) data storage, data about results of the metrics generation and application of any constraints.

In an embodiment, data writer 136 interfaces with a reports generator component that generates a human-readable report, which may be consumed by a UX to be rendered into a visualization.

If user 102 has written some custom configuration for a component, as reflected in the monitoring definition, then that component is replaced by what user 102 has authored and then the replacement component is executed. Thus, each of the components of analyzer framework core 130 is extensible in that a user may remove and add routines or code (to the corresponding component) that is executed at runtime. For example, instead of requiring all users of ML monitoring system 100 to read data from a certain source, data reader 132 may be extensible in that a user may instruct data reader 132 to read data from other storage locations, whether local or remote. For example, data may be read from local storage, from OCI (Oracle Cloud Interface) object storage, or from third-party cloud storage.

As other examples, a user may write custom code to transform read data in a new way, generate a new (custom) type of metric, and/or generate a new report.

Metrics

A metric is a calculated value that pertains to a feature/attribute, where the attribute is an attribute in raw data ("raw attribute") or is derived from a raw attribute ("derived attribute"), such as from multiple raw attributes. (Raw data is data that is found in a data set that is read by data reader 132 before any operations are performed on the data set.) Examples of pre-defined types of metrics include count (or sum), average, maximum, minimum, median, (e.g., $10^{th}$) percentile, uniqueness, and standard deviation. For example, if each row in a raw data set corresponds to the sale of a home, the row may include the zip code (raw attribute) of the home that was sold. A metric may be the number of homes sold from a particular zip code (raw attribute) and/or the number of homes sold from a particular zip code in the last six months (derived attribute), which number is based on two raw attributes.

Constraints

Constraints are predicates that are defined on metrics. Examples of constraint operators include greater than, less than, greater than or equal to, less than or equal to, equal, not equal. An example of a constraint is the number of homes sold (in a particular zip code that were sold for more than one million dollars in the last year) being less than two thousand. If metrics generator 134 determines that a constraint is not satisfied, then system 100 generates an alert that the constraint has been violated. The alert may identify the constraint and the value of the corresponding metric.

Constraints may be applied to training data (i.e., a dataset upon which a ML model is trained) and/or to inference data, which is data that is input to a trained ML model. For example, a constraint may be a measure of statistical difference (between (1) a first metric generated based on training data and (2) a second metric generated based on inference data) being less than a particular value.

There are two main types of constraints: (1) constraints that are defined on the metric computed on the current snapshot/batch and (2) constraints that are defined across snapshots but between the same metric on the same feature. The first type of constraint helps determine whether something is completely off with the current batch of data. The second type of constraint helps detect drift. For constraints of the second type, metrics generator 134 extracts/de-serializes the output from a prior run (that resulted in creating a snapshot) and compares that output with the metric under consideration. Metrics generator 134 performs constraint checking at the end of aggregation once metrics are fully computed.

Monitoring Definition

Figure 2A:
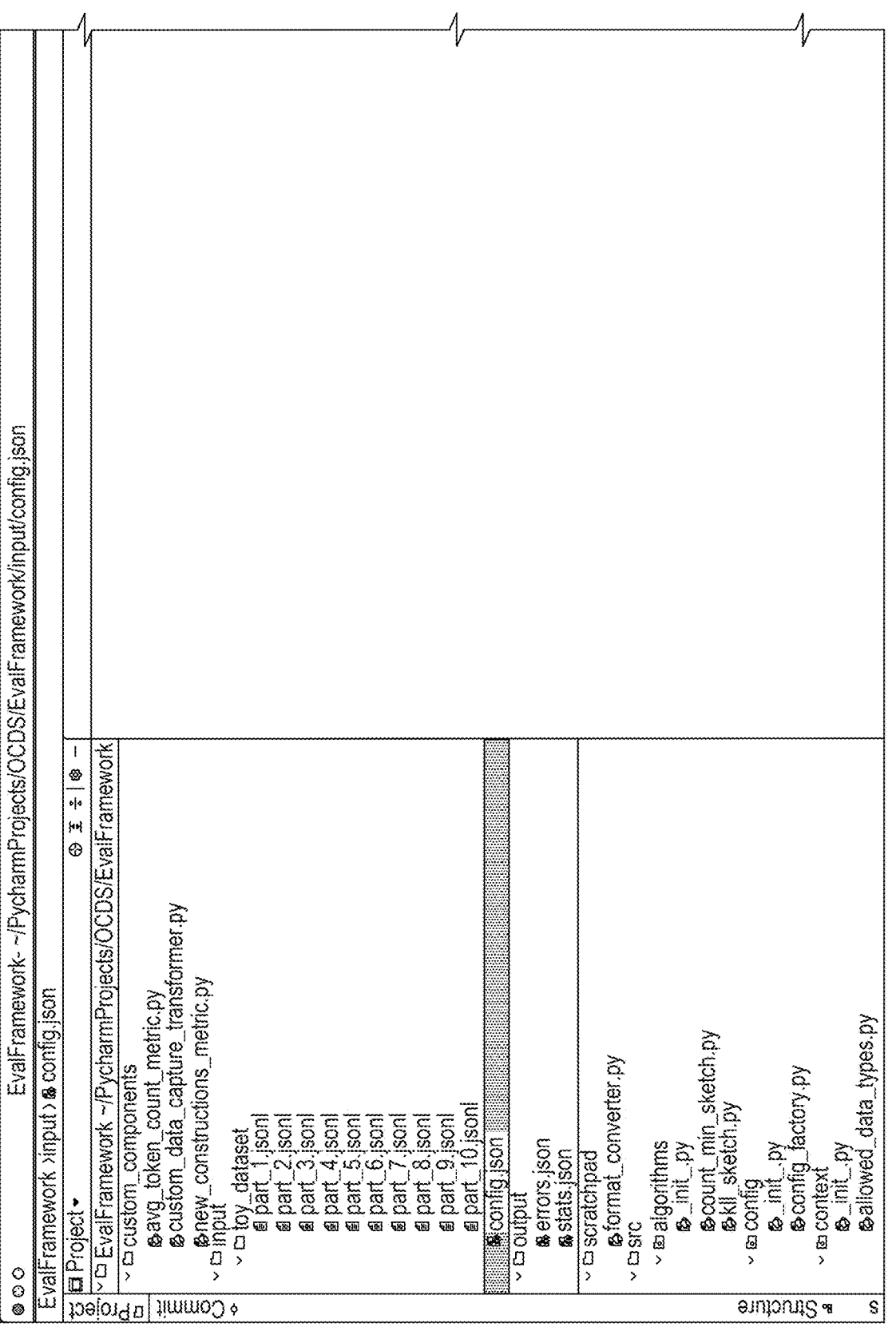
FIG. 2A is a screenshot of an example configuration data of a monitoring definition that is input to a data monitoring service, in an embodiment.

FIG. 2A is a screenshot of an example configuration data 200 of a monitoring definition that is input to ML monitoring service 110, in an embodiment. Configuration data 200 includes a feature type map portion 212, a data reader portion 214, and a transformers portion 216. Feature type map portion 212 maps raw attribute features to data types, such as text, integers, cardinals, and fractionals. Data reader portion 214 identifies a predefined line reader. A user may select one or more pre-defined data readers, depending on the format of the data set that is to be read. If a user has a data set that is not in a format that is recognizable by a pre-defined reader of the extensible data monitoring framework, then the user may provide their own code that is able to read and parse such a data set. Example formats of a data set include JSON (JavaScript Objection Notation), CSV (comma-separated values), TSV (tab-separated values), and nested JSON.

Similarly, transformers portion 216 identifies two pre-defined transformers: line sanitizer and json transformer. A user may select one or more pre-defined transformers, depending on the transformations that the user wishes to be performed. If a user requires a transformer that is different than any of the available pre-defined transformers provided by the extensible data monitoring framework, then the user may specify/provide their own (custom) code that is able to perform such a transformation.

Figure 2B:
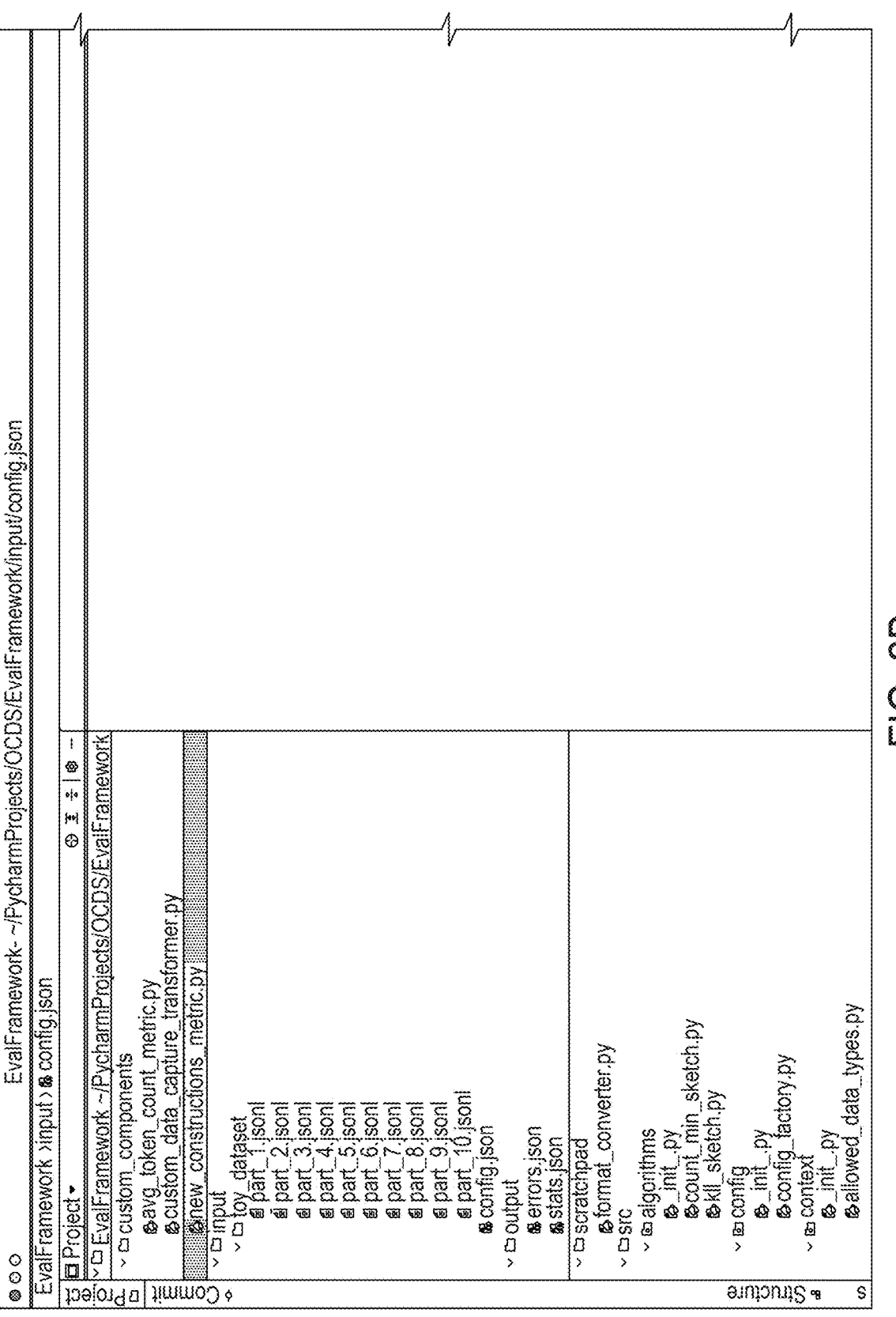
FIG. 2B is a screenshot of another portion of the configuration data, in an embodiment.

FIG. 2B is a screenshot of another portion of configuration data 200, in an embodiment. This other portion of configuration data 200 includes a metrics portion 220, a sub-portion of which includes a custom metrics portion 222. Metrics portion 220 identifies multiple features (or raw attributes) and one or more metrics for each feature. For example, the feature "Boro-block-lot" is associated with a single metric, the uniqueness metric, which calculates the number of distinct values in a data set; the data set in this case being defined as all values of the feature "Boro-block-lot" in a particular data set. As another example, the feature "total units" is associated with at least five metrics, including minimum, maximum, mean, and sum, all of which are predefined.

Metrics portion 220 also includes the metric "Year Built", which is associated with three metrics, one of which is a custom metric, which is shorthand for a metric on a custom (i.e., not pre-predefined) feature. The parameters of this custom feature are name ("NumOfNewBuildings"), location, and year. A custom feature is a feature that is generated by combining different pieces of data together. The value of the location parameter identifies a storage location where the configuration code is located, which code is converted into executable code (by configuration factory 122) and executed at runtime (by analyzer framework core 130). The value of the year parameter is an input to the executable code.

Figure 2C:
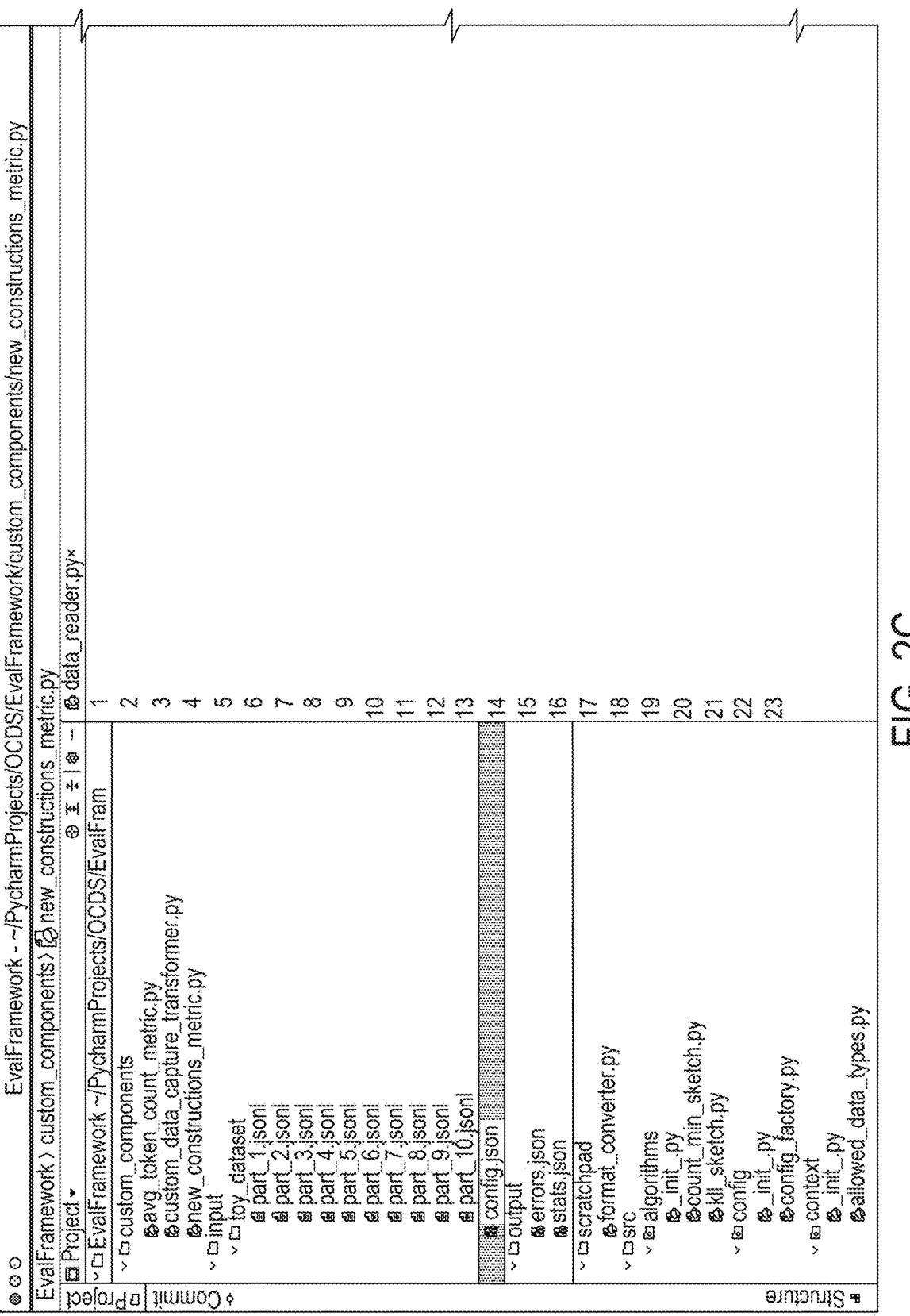
FIG. 2C is a screenshot of example custom configuration code for a custom metric, in an embodiment.

FIG. 2C is a screenshot of example custom configuration code 230 for a custom metric, in an embodiment. The custom code includes code for initializing two state variables ('total_new_buildings' and 'year') and updating the first state variable when the "update_state" function is invoked. Custom configuration code 230 also includes a function ('get_aggregated_value') for returning that first state variable after a data set (or a portion thereof) is read. Configuration factory 122 invokes a module that processes the custom code. In this example, custom configuration code 230 is stored in a file that is separate from the main configuration code in configuration data 200. In another example, custom configuration code 230 may be inserted into custom metric portion 222, rather than custom metric portion 222 referencing custom configuration code 230 using the value of the location parameter.

Figure 2D:
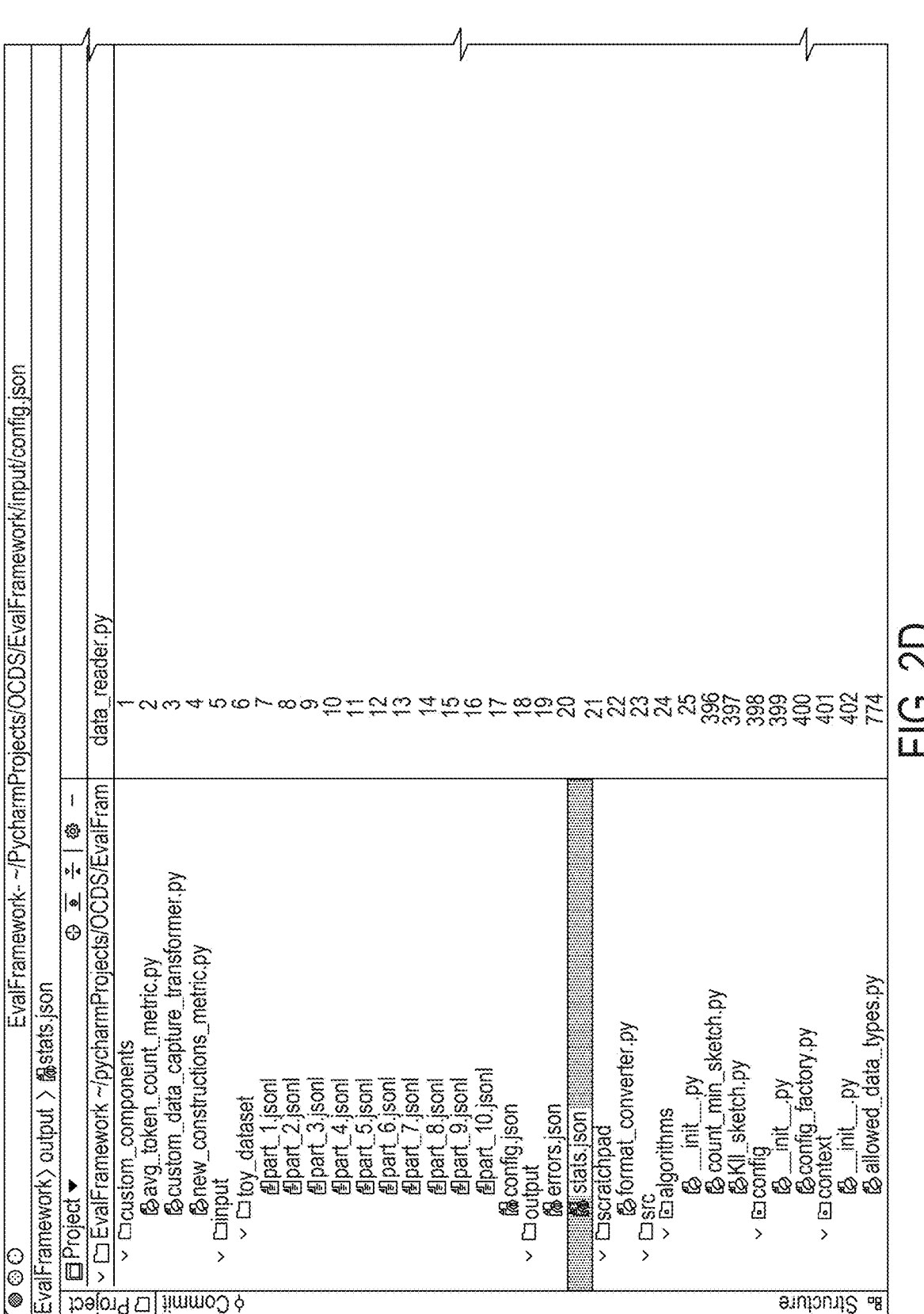
FIGS. 2D-2E are screenshots of example output from a data writer, in an embodiment.
Figure 2E:
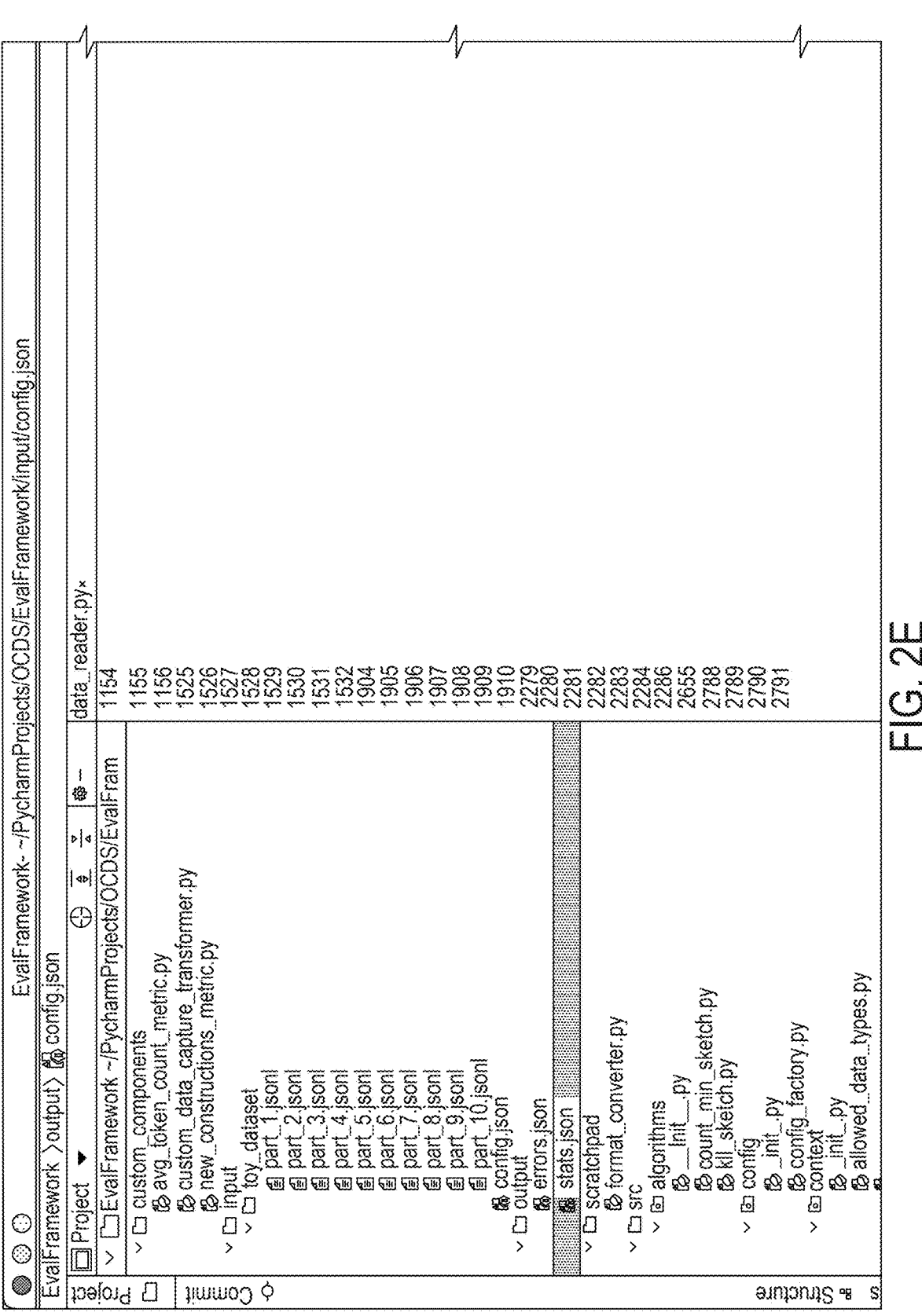

FIGS. 2D-2E are screenshots of example output from a data writer, in an embodiment. Output 240 (depicted in FIG. 2D) includes attribute/feature names, one or more metrics for each feature name, and one or more values corresponding to the one or more metrics. For example, output 240 indicates the feature name "Boro-Block-Lot" and for that feature, the metric type of uniqueness and a value of ~34.87. Metrics generator 134 generated multiple metrics for other features, such as "Building Classification" and "Estimated Expense," as indicated in metrics portion 220.

Output 250 (depicted in FIG. 2E) is from the same data writer as output 240 and is based on the same read input data set. Output 250 indicates the feature name "Year Built" along with a new metric ("NumofNewBuildings") and the value 93, indicating that there have been 93 new buildings since the input year, which is 2010, in this example.

Figure 2F:
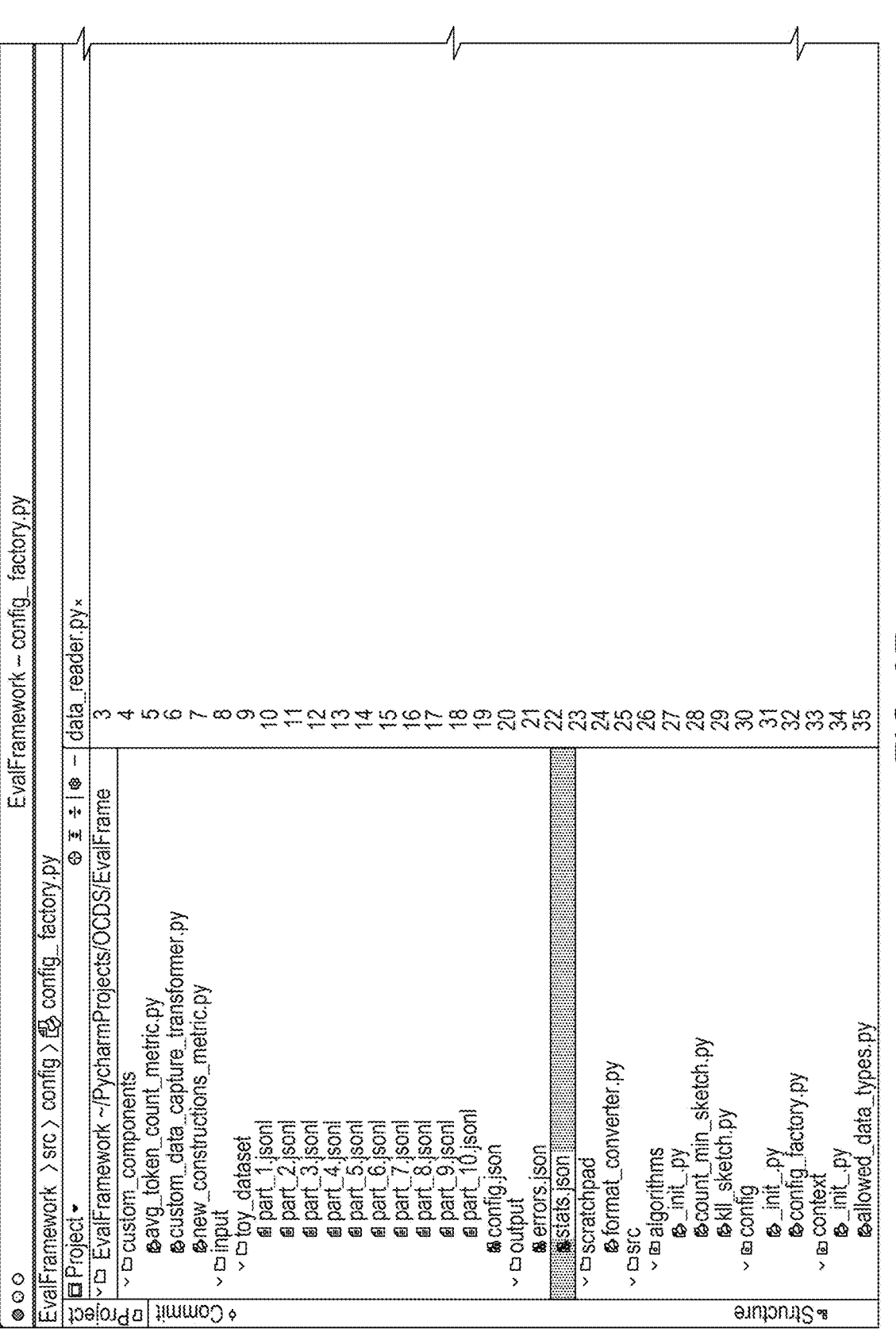
FIG. 2F is a screenshot of an example configuration factory code, in an embodiment.

FIG. 2F is a screenshot of an example configuration factory code 260, in an embodiment. Configuration factory code 260 includes a list of mappings, each mapping associating (a) a value (in the configuration data) of a predefined (or custom) type to (b) a function (or code interface) to invoke. When processed, configuration factory code 260 causes a monitoring definition to be parsed and invokes code objects. A result of processing configuration factory code 260 is a constructed object that includes one or more code objects of data reader 132, one or more code objects of metric generator 134, and one or more code objects of data writer 136. This constructed object is then processed by evaluation runner 124.

Evaluation Context

In an embodiment, analyzer framework core 130 includes an evaluation context (not depicted), which is passed by evaluation runner 124, but initialized by configuration factory 122. The evaluation context is not part of the configuration data and not exposed or visible to user 102. The evaluation context is immutable and is read-accessible across all the components of analyzer framework core 130. The evaluation context is used as a data passing mechanism for parameters that are common across all the components of analyzer framework core 130. For example, generating reports may be different depending on whether it is the core is in production or in development. In production, the report is published and a snapshot resource is created. In development, a report may simply be printed on a computer screen based on the appropriate context parameter.

As another example, a metric might fail to be computed or a constraint might fail due to data quality reasons. The context has a tolerance threshold for specific errors, such as "FailureToComputeMetric" or "FailureToValidateConstraint" that are common across all metrics. As another example, the evaluation context may contain a configuration for raising alarms upon constraint validation failures as well as other types failures.

Also, an evaluation context may contain configuration and parameters that are not component-specific, but rather orchestration specific.

State Aggregator

In an embodiment, analyzer framework core 130 executes on a single computing device or node. This may be done for efficiencies purposes. However, resources, such as memory, are limited, which may affect that ability to process large datasets, such as datasets that are terabytes in size. It would be helpful for ML monitoring system 100 to be able to work on arbitrarily large datasets. In order to do so, compute routines of the metrics interface (e.g., metrics generator 134) has access to only partial data, such as a single row of a dataset or a chunk (multiple rows) of a dataset, since there is no guarantee that an entire dataset is able to fit in memory.

In an embodiment, the metrics interface maintains state and implements a set of aggregate queries. For example, mean calculation is performed using aggregate queries in a two-step process. Analyzer framework core 130 mandates that metrics have a state. Thus, for mean, state is maintained, which computes sum and count for each chunk (such as each one thousands rows from an input dataset. Once all chunks are processed and state is generated for each chunk, the state of all the chunks are aggregated. The metric itself exposes routines to define state as well as the method to aggregate states. This state information may be stored in the evaluation context.

Some metrics cannot be exactly computed using incremental data processing, such as chunk-based processing. Certain metrics, such as median, need to be approximated from constructing compact quantile forms, such as Sketches. Thus, this method of defining metrics results in approximations for certain metric types while operating on large datasets.

Depending on how the code is run, chunks may be processed in parallel (spark) or serially (e.g., using Java or Python). Having such a paradigm ensures the code can deal with arbitrarily large datasets. One beneficial side-effect is that this makes implementations locally testable, even on laptops with limited memory constraints by looping through and aggregating metrics on large datasets.

Monitoring Definition Templates

In an embodiment, ML monitoring system 100 includes multiple monitoring definition templates. Each monitoring definition template may have similar (or the same) predefined data readers, metrics generator, and/or data writers. One difference between different monitoring definition templates is the source from which an input dataset is read. For example, one monitoring definition template includes first location data that specifies a first cloud provider and another monitoring definition template includes second location data that specifies a second cloud provider that is different than the first cloud provider. A user that selects one of these two templates primarily provides credential data (e.g., username and password) in order to access the input dataset from the corresponding cloud provider. Other than that, the main data the user specifies in the selected monitoring definition template are (1) the names of one or more features/attributes, (2) a set of one or more metrics for each named feature, and (3) a set of one or more constraints.

In an embodiment, ML monitoring system 100 provides a graphical user interface (GUI) that presents GUI elements for allowing user 102 to select predefined components, such as a drop menu of predefined data readers, a drop down menu of predefined data transformers, and drop menu of predefined data writers. Some of the data readers and data writers may be default selected. The GUI may also provide one or more GUI elements for allowing user 102 to (1) specify feature names, (2) select one or more metrics (e.g., min, max, mean) for each specified feature name, and (3) specify one or more constraints. Once a sufficient selection is made through the GUI (e.g., at least one data reader is selected, a valid location of the input dataset is specified, at least one metric is specified, at least one constraint is specified, and at least one data writer is selected), then ML monitoring system 100 automatically generates a monitoring definition, which ML monitoring system 100 (e.g., monitoring service 110) may transmit to configuration factory 122 immediately.

Example Use Cases

The following table illustrates some use-cases that might require users of ML monitoring system 100 to implement their own routines in addition to those provided by the data monitoring framework:

| Framework Component | OOTB Implementation | Possible Custom Implementation |
|---|---|---|
| Data Reader | OCI object store reader | Custom Data Reader that reads from a different cloud provider's data store |
| Data Transformer | Transformers that accept data in JSON, CSV, TSV, and Parquet and convert to internal normalized KV representation | Transformers that accept customer specific business objects (e.g., nested JSON or flat-files) with data across different source files. |
| Statistical Representations | Well known distributions (like Gaussian) on numerical data types; word-count on textual data, etc. | Business specific metrics on data, which metrics might be related to the domain. For example, in the health-care domain, a user of system 100 might want to get number of patients with one or more co-morbid flags in the dataset as a metric. |
| Drift Metric | KL-divergence, KS-test, Z-score, p-value etc. | Any conditional logic that doesn't necessarily need to be represented as a statistical metric. |
| Alerting | Email, OCI monitoring | Custom Slack channel or a Teams room |

Example Process

FIG. 3 is a flow diagram that depicts an example process 300 for data monitoring, in an embodiment. Process 300 may be performed by different components of ML monitoring system 100.

At block 310, a data monitoring definition is accessed. The data monitoring definition includes predefined configuration data and custom configuration data that is specified by a user. The custom configuration data includes custom instructions pertaining to one of data reading, metrics generation, or data writing. The data monitoring definition may be based on a data monitoring definition template that was predefined, selected by the user, and modified by the user to create or result in) the data monitoring definition.

At block 320, executable code is generated based on the monitoring definition. Block 320 may be performed by configuration factory 122. Block 320 may involve validating the configuration data in the data monitoring definition, including the custom configuration data, ensuring that the configuration data is well-formed. The executable code includes a data reading portion, a metrics generation portion, and a data writing portion, each portion corresponding to a different portion of the configuration data in the data monitoring definition.

At block 330, the executable code is executed. Block 330 may be performed by evaluation runner 124. Block 330 may involve evaluation runner 124 invoking an object or function associated with the data reading portion.

At block 340, based on the data reading portion in the executable code, an input dataset is retrieved (or read) from a location that is based on location data specified in the data monitoring definition. Block 340 may involve data reader

132 sending a data read request to a cloud service, a local storage device, or other storage mechanism indicated in the location data.

At block 350, based on the metrics generation portion in the executable code, a set of metrics is generated based on the data set. Block 350 may be triggered by evaluation runner 124 invoking an object or function associated with the metrics generation portion. Block 350 may involve metrics generator 134 generating metric values based on one or more metrics specified for one or more features indicated in the data monitoring definition. Block 350 may also involve metrics generator 134 (or a constraints component, not depicted in FIG. 1) applying one or more constraints to the generated metric values.

At block 360, based on the data writing portion in the executable code, a result that is based on the metrics values and/or the application of the one or more constraints is written to storage, such as persistent storage. Block 360 may also involve presenting the result on a screen of a computing device, such as a computing device of user 102. Additionally or alternatively, block 360 may involve generating an alert that is transmitted immediately to one or more entities, such as via a SMS (or text) message, an automated phone call, an email message, or a software application notification. Such an alert may be warranted based on the seriousness of a constraint that is violated or the extent to which the constraint is violated. For example, if the value of a metric is two times greater than a constraint threshold, then a regular report is generated, whereas if the value is three times greater than the constraint threshold, then a text message alert is generated and transmitted immediately.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
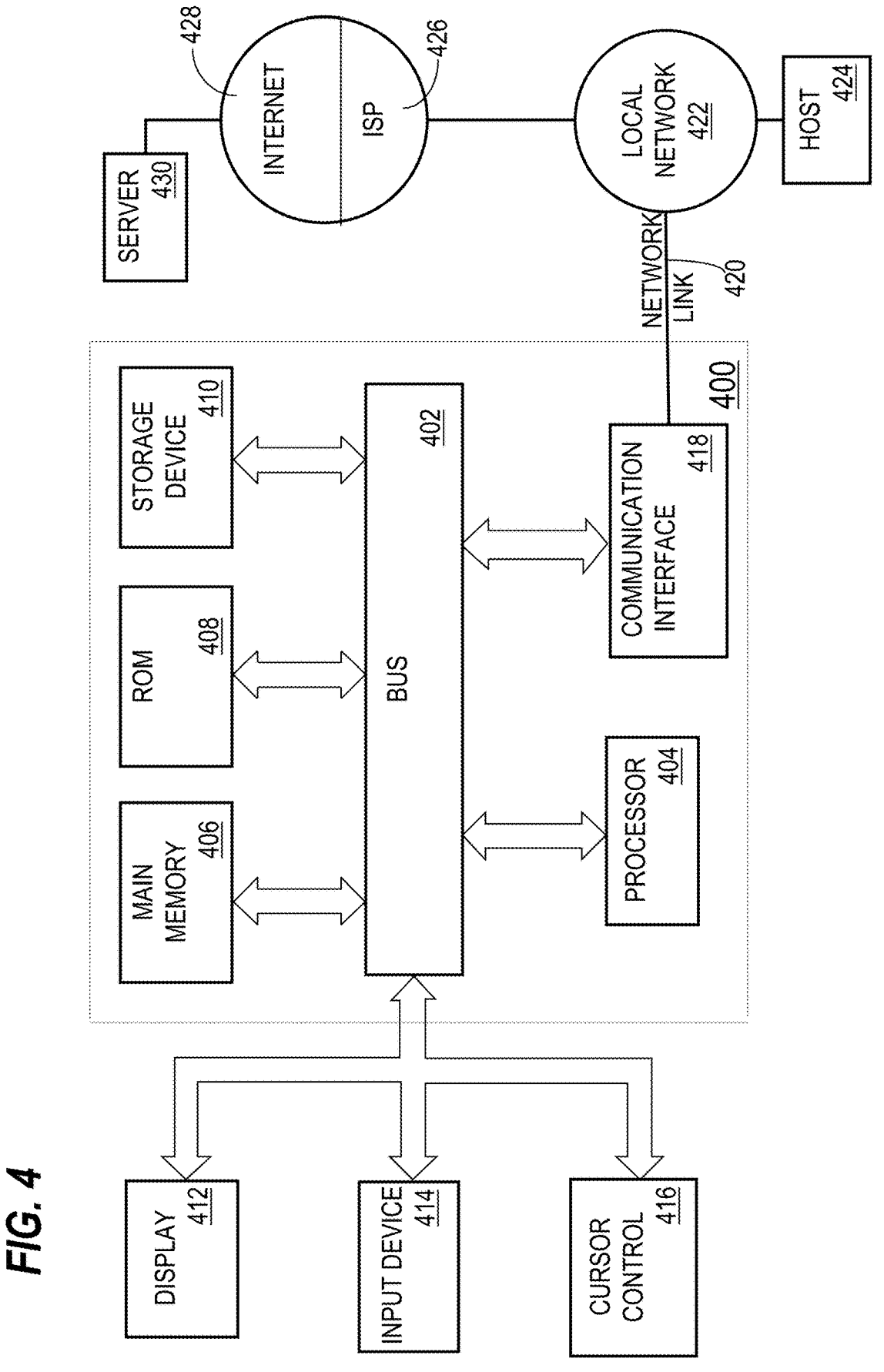
FIG. 4 is a block diagram that illustrates an example computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
accessing, by a machine learning monitoring system, a data monitoring definition that is used to monitor drift or quality of data that is related to one or more machine-learned models, wherein the data monitoring definition includes predefined configuration data and a custom configuration data that is specified by a user through a computing device that is separate from the machine learning monitoring system, wherein the custom configuration data includes custom instructions pertaining to one or more of data reading, metrics generation, or data writing;
based on the data monitoring definition, generating, by the machine learning monitoring system, executable code that comprises a data reading portion, a metrics generation portion, and a data writing portion;
executing, by the machine learning monitoring system, the executable code, wherein executing the executable code comprises:
based on the data reading portion in the executable code, reading a dataset based on location data specified in the data monitoring definition;
based on the metrics generation portion in the executable code, reading the dataset and generating a set of metrics based on the dataset;
based on the data writing portion in the executable code, reading the set of metrics and writing a result that is based on the set of metrics;
wherein the method is performed by one or more computing devices.

2. The method of claim 1, wherein the custom configuration data specifies a location to read the dataset.

3. The method of claim 1, wherein the custom configuration data specifies a custom data reader that reads the dataset from a specified location.

4. The method of claim 1, wherein the custom configuration data specifies a custom data transformer that transforms data from the dataset from one data format to another data format.

5. The method of claim 1, wherein the custom configuration data specifies instructions for generating a custom metric based on data in the dataset.

6. The method of claim 1, wherein the custom configuration data specifies a custom data writer that is configured to write the result.

7. The method of claim 1, further comprising, prior to generating the executable code, analyzing the data monitoring definition for any malformed configuration data.

8. The method of claim 1, further comprising, prior to receiving the data monitoring definition:
storing a plurality of data monitoring definition templates that includes a first data monitoring definition template and a second data monitoring definition template that is different than the first data monitoring definition template;
receiving first user input that selects the first data monitoring definition template;
receiving second user input that modifies the first data monitoring definition template to create the data monitoring definition.

9. One or more non-transitory storage media storing instructions which, when executed by one or more computing devices, cause:
accessing, by a machine learning monitoring system, a data monitoring definition that is used to monitor drift or quality of data that is related to one or more machine-learned models, wherein the data monitoring definition includes predefined configuration data and a custom configuration data that is specified by a user through a computing device that is separate from the machine learning monitoring system, wherein the custom configuration data includes custom instructions pertaining to one or more of data reading, metrics generation, or data writing;
based on the data monitoring definition, generating, by the machine learning monitoring system, executable code that comprises a data reading portion, a metrics generation portion, and a data writing portion;
executing, by the machine learning monitoring system, the executable code, wherein executing the executable code comprises:
based on the data reading portion in the executable code, reading a dataset based on location data specified in the data monitoring definition;
based on the metrics generation portion in the executable code, reading the dataset and generating a set of metrics based on the dataset;
based on the data writing portion in the executable code, reading the set of metrics and writing a result that is based on the set of metrics.

10. The one or more non-transitory storage media of claim 9, wherein the custom configuration data specifies a location to read the dataset.

11. The one or more non-transitory storage media of claim 9, wherein the custom configuration data specifies a custom data reader that reads the dataset from a specified location.

12. The one or more non-transitory storage media of claim 9, wherein the custom configuration data specifies a custom data transformer that transforms data from the dataset from one data format to another data format.

13. The one or more non-transitory storage media of claim 9, wherein the custom configuration data specifies instructions for generating a custom metric based on data in the dataset.

14. The one or more non-transitory storage media of claim 9, wherein the custom configuration data specifies a custom data writer that is configured to write the result.

15. The one or more non-transitory storage media of claim 9, wherein the instructions, when executed by the one or more computing devices, further cause, prior to generating the executable code, analyzing the data monitoring definition for any malformed configuration data.

16. The one or more non-transitory storage media of claim 9, wherein the instructions, when executed by the one or more computing devices, further cause, prior to receiving the data monitoring definition:

storing a plurality of data monitoring definition templates that includes a first data monitoring definition template and a second data monitoring definition template that is different than the first data monitoring definition template;

receiving first user input that selects the first data monitoring definition template;

receiving second user input that modifies the first data monitoring definition template to create the data monitoring definition.

17. A system comprising:

one or more computing devices;

one or more storage media storing instructions which, when executed by the one or more computing devices, cause:

accessing, by a machine learning monitoring system, a data monitoring definition that is used to monitor drift or quality of data that is related to one or more machine-learned models, wherein the data monitoring definition includes predefined configuration data and a custom configuration data that is specified by a user through a computing device that is separate from the machine learning monitoring system, wherein the custom configuration data includes custom instructions pertaining to one or more of data reading, metrics generation, or data writing;

based on the data monitoring definition, generating, by the machine learning monitoring system, executable code that comprises a data reading portion, a metrics generation portion, and a data writing portion;

executing, by the machine learning monitoring system, the executable code, wherein executing the executable code comprises:

based on the data reading portion in the executable code, reading a dataset based on location data specified in the data monitoring definition;

based on the metrics generation portion in the executable code, reading the dataset and generating a set of metrics based on the dataset;

based on the data writing portion in the executable code, reading the set of metrics and writing a result that is based on the set of metrics.

18. The system of claim 17, wherein the custom configuration data specifies:

a location to read the dataset, a custom data reader that reads the dataset from a specified location, a custom data transformer that transforms data from the dataset from one data format to another data format, instructions for generating a custom metric based on data in the dataset, or a custom data writer that is configured to write the result.

19. The system of claim 17, wherein the instructions, when executed by the one or more computing devices, further cause, prior to generating the executable code, analyzing the data monitoring definition for any malformed configuration data.

20. The system of claim 17, wherein the instructions, when executed by the one or more computing devices, further cause, prior to receiving the data monitoring definition:

storing a plurality of data monitoring definition templates that includes a first data monitoring definition template and a second data monitoring definition template that is different than the first data monitoring definition template;

receiving first user input that selects the first data monitoring definition template;

receiving second user input that modifies the first data monitoring definition template to create the data monitoring definition.

* * * * *